United States Patent
Nash et al.

(10) Patent No.: US 10,563,512 B2
(45) Date of Patent: Feb. 18, 2020

(54) GAS TURBINE ENGINE AIRFOIL

(71) Applicant: United Technologies Corporation, Farmington, CT (US)

(72) Inventors: Timothy Charles Nash, Vernon, CT (US); Carey Clum, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 58 days.

(21) Appl. No.: 15/793,415

(22) Filed: Oct. 25, 2017

(65) Prior Publication Data
US 2019/0120058 A1    Apr. 25, 2019

(51) Int. Cl.
*F01D 5/14*    (2006.01)

(52) U.S. Cl.
CPC .......... *F01D 5/141* (2013.01); *F05D 2220/32* (2013.01); *F05D 2240/121* (2013.01); *F05D 2240/301* (2013.01); *F05D 2240/303* (2013.01); *F05D 2250/70* (2013.01)

(58) Field of Classification Search
CPC ................. F01D 5/141; F05D 2220/32; F05D 2240/121; F05D 2240/301; F05D 2240/303; F05D 2250/70
USPC ..................................................... 416/241 R
See application file for complete search history.

(56) References Cited

U.S. PATENT DOCUMENTS

| | | | |
|---|---|---|---|
| 4,431,376 A | 2/1984 | Lubenstein et al. | |
| 4,695,228 A | 9/1987 | Purcaru | |
| 4,941,803 A | 7/1990 | Wainauski et al. | |
| 6,457,938 B1 * | 10/2002 | Liu | F01D 5/141 415/148 |

(Continued)

FOREIGN PATENT DOCUMENTS

| | | |
|---|---|---|
| EP | 1245784 | 10/2002 |
| WO | 2016173875 | 11/2016 |

OTHER PUBLICATIONS

Berggren and Graham. National Advisory Committee for Aeronautics. Technical Note 3172. Effects of Leading-Edge Radius and Maximum Thickness-Chord Ratio on the Variation With Mach Number of the Aerodynamic Characteristics of Several Thin NACA Airfoil Setions. Apr. 14, 1954. pp. 1-66.

(Continued)

*Primary Examiner* — Joseph J Dallo
*Assistant Examiner* — Yi-Kai Wang
(74) *Attorney, Agent, or Firm* — Carlson, Gaskey & Olds, P.C.

(57) ABSTRACT

A component for a gas turbine engine includes a platform that has a radially inner side and a radially outer side. A root portion extends from the radially inner side of the platform. An airfoil extends from the radially outer side of the platform. The airfoil includes a pressure side that extends between a leading edge and a trailing edge. A suction side extends between the leading edge and the trailing edge. A ratio of leading edge radius to maximum thickness is between 0.40 ($r/T_{max}$) and 0.45 ($r/T_{max}$) and a ratio of leading edge radius to axial chord length is between 0.17 ($r/b_x$) and 0.27 ($r/b_x$).

18 Claims, 4 Drawing Sheets

(56) References Cited

U.S. PATENT DOCUMENTS

| | | | |
|---|---|---|---|
| 7,179,058 B2 | 2/2007 | Chandraker | |
| 8,419,373 B1* | 4/2013 | Fukami | F03D 1/0633 |
| | | | 415/4.3 |
| 2003/0231961 A1* | 12/2003 | Chandraker | F01D 5/141 |
| | | | 416/243 |
| 2008/0056902 A1* | 3/2008 | Ravanis | F01D 5/141 |
| | | | 416/223 R |
| 2015/0354365 A1* | 12/2015 | Balzer | F01D 5/02 |
| | | | 416/95 |
| 2018/0231021 A1* | 8/2018 | Wilson | F01D 5/141 |

OTHER PUBLICATIONS

The Extended European Search Report for EP Application No. 18202643.5, dated May 25, 2019.

* cited by examiner

GAS TURBINE ENGINE AIRFOIL

BACKGROUND

This disclosure relates to a gas turbine engine airfoil. More particularly, this disclosure relates to a gas turbine engine airfoil having an improved design.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The shape of an airfoil designed for turbomachinery applications is an important characteristic. It is often a result of multidisciplinary considerations including aerodynamics, durability, structure and design. However, recent advances in the design of aerodynamically high-performing, high-pressure turbine blades, particularly at the tip, have caused increased difficulties in the design of blades.

SUMMARY

In one exemplary embodiment, a component for a gas turbine engine includes a platform that has a radially inner side and a radially outer side. A root portion extends from the radially inner side of the platform. An airfoil extends from the radially outer side of the platform. The airfoil includes a pressure side that extends between a leading edge and a trailing edge. A suction side extends between the leading edge and the trailing edge. A ratio of leading edge radius to maximum thickness is between 0.40 ($r/T_{max}$) and 0.45 ($r/T_{max}$) and a ratio of leading edge radius to axial chord length is between 0.17 ($r/b_x$) and 0.27 ($r/b_x$).

In a further embodiment of any of the above, the ratio of the leading edge radius to maximum chord thickness at 0% span is between approximately 0.43-0.47 ($r/T_{max}$).

In a further embodiment of any of the above, the ratio the leading edge radius to maximum chord thickness at 25% span is between approximately 0.41-0.45 ($r/T_{max}$).

In a further embodiment of any of the above, the ratio of the leading edge radius to maximum chord thickness at 50% span is between approximately 0.41-0.45 ($r/T_{max}$).

In a further embodiment of any of the above, the ratio of the leading edge radius to maximum chord thickness at 75% span is between approximately 0.42-0.47 ($r/T_{max}$).

In a further embodiment of any of the above, the ratio of the leading edge radius to maximum chord thickness at 100% span is between approximately 0.39-0.43 ($r/T_{max}$).

In a further embodiment of any of the above, the ratio of the leading edge radius to maximum chord thickness increases from 100% span to 75% span. It decreases from 75% span to 25% span and increases from 25% span to 0% span.

In a further embodiment of any of the above, the maximum thickness is the maximum thickness of the airfoil measured along a line perpendicular to a chord line. The leading edge radius is the radius of the largest circular that can fit within the perimeter of the airfoil adjacent the leading edge.

In a further embodiment of any of the above, the ratio of the leading edge radius to axial chord length at 100% span is between approximately 0.15-0.19 ($r/b_x$) and at 0% span is between approximately 0.25-0.29 ($r/b_x$).

In a further embodiment of any of the above, the airfoil is a blade and extends from the platform to an unshrouded end.

In another exemplary embodiment, a gas turbine engine includes a compressor section and a turbine section. A circumferential array of airfoils are located in one of the compressor section and the turbine section. The airfoil includes a pressure side that extends between a leading edge and a trailing edge. A suction side extends between the leading edge and the trailing edge. A ratio of leading edge radius to maximum thickness of between 0.40 ($r/T_{max}$) and 0.45 ($r/T_{max}$). A ratio of leading edge radius to axial chord length of between 0.17 ($r/b_x$) and 0.27 ($r/b_x$).

In a further embodiment of any of the above, the ratio of the leading edge radius to maximum chord thickness at 0% span is between approximately 0.43-0.47 ($r/T_{max}$).

In a further embodiment of any of the above, the ratio the leading edge radius to maximum chord thickness at 25% span is between approximately 0.41-0.45 ($r/T_{max}$).

In a further embodiment of any of the above, the ratio of the leading edge radius to maximum chord thickness at 50% span is between approximately 0.41-0.45 ($r/T_{max}$).

In a further embodiment of any of the above, the ratio of the leading edge radius to maximum chord thickness at 75% span is between approximately 0.42-0.46 ($r/T_{max}$).

In a further embodiment of any of the above, the ratio of the leading edge radius to maximum chord thickness at 100% span is between approximately 0.39-0.43 ($r/T_{max}$).

In a further embodiment of any of the above, the ratio of the leading edge radius to maximum chord thickness increases from 100% span to 75% span. It decreases from 75% span to 25% span and increases from 25% span to 0% span.

In a further embodiment of any of the above, the maximum thickness is the maximum thickness of the airfoil measured along a line perpendicular to a chord line. The leading edge radius is the radius of the largest circular that can fit within the perimeter of the airfoil adjacent the leading edge.

In a further embodiment of any of the above, the ratio of the leading edge radius to axial chord length follows a generally linear increasing pattern from 100% span to 0% span.

In a further embodiment of any of the above, the airfoil is a blade and extends from a platform to an unshrouded end.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
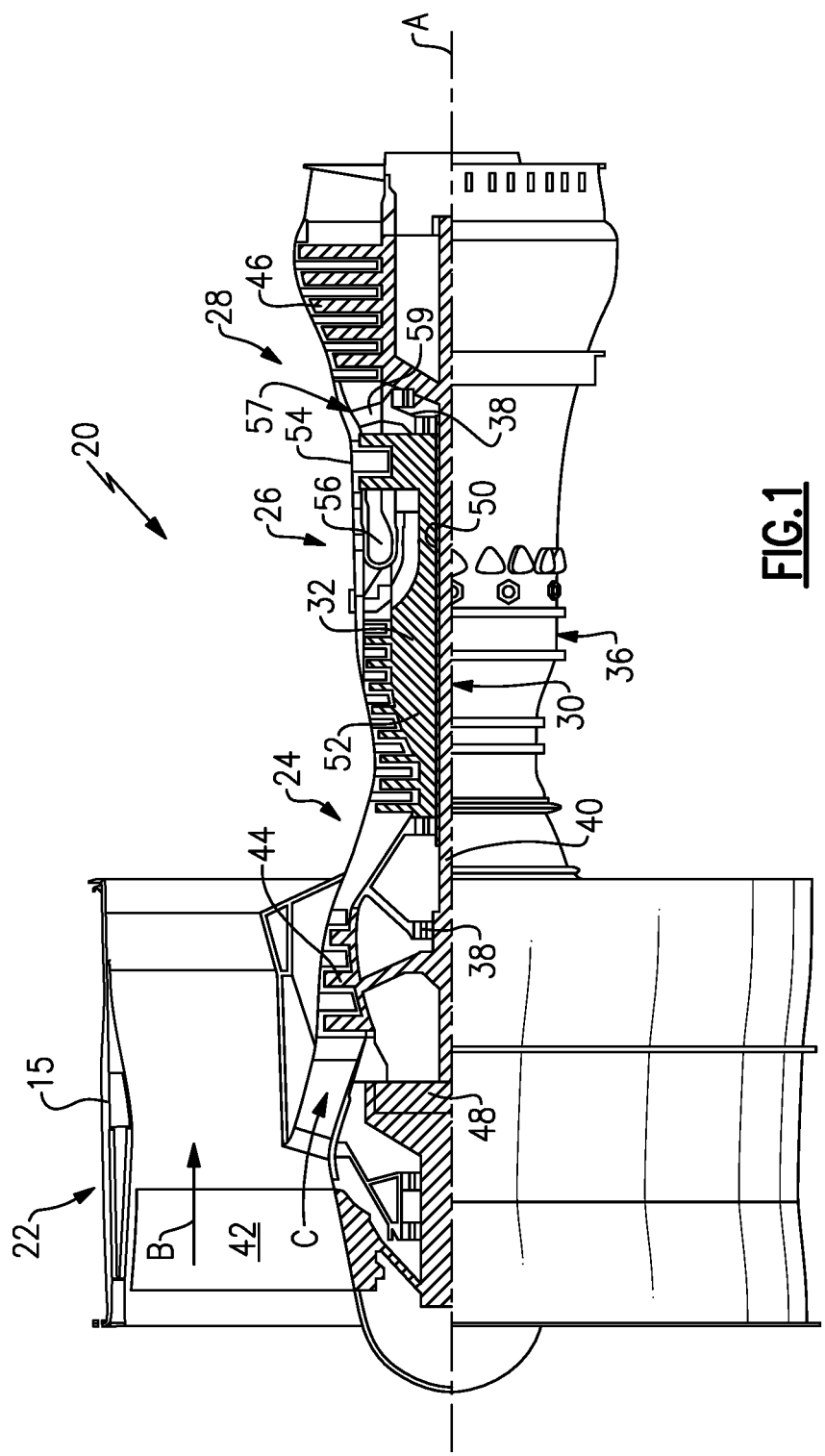
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
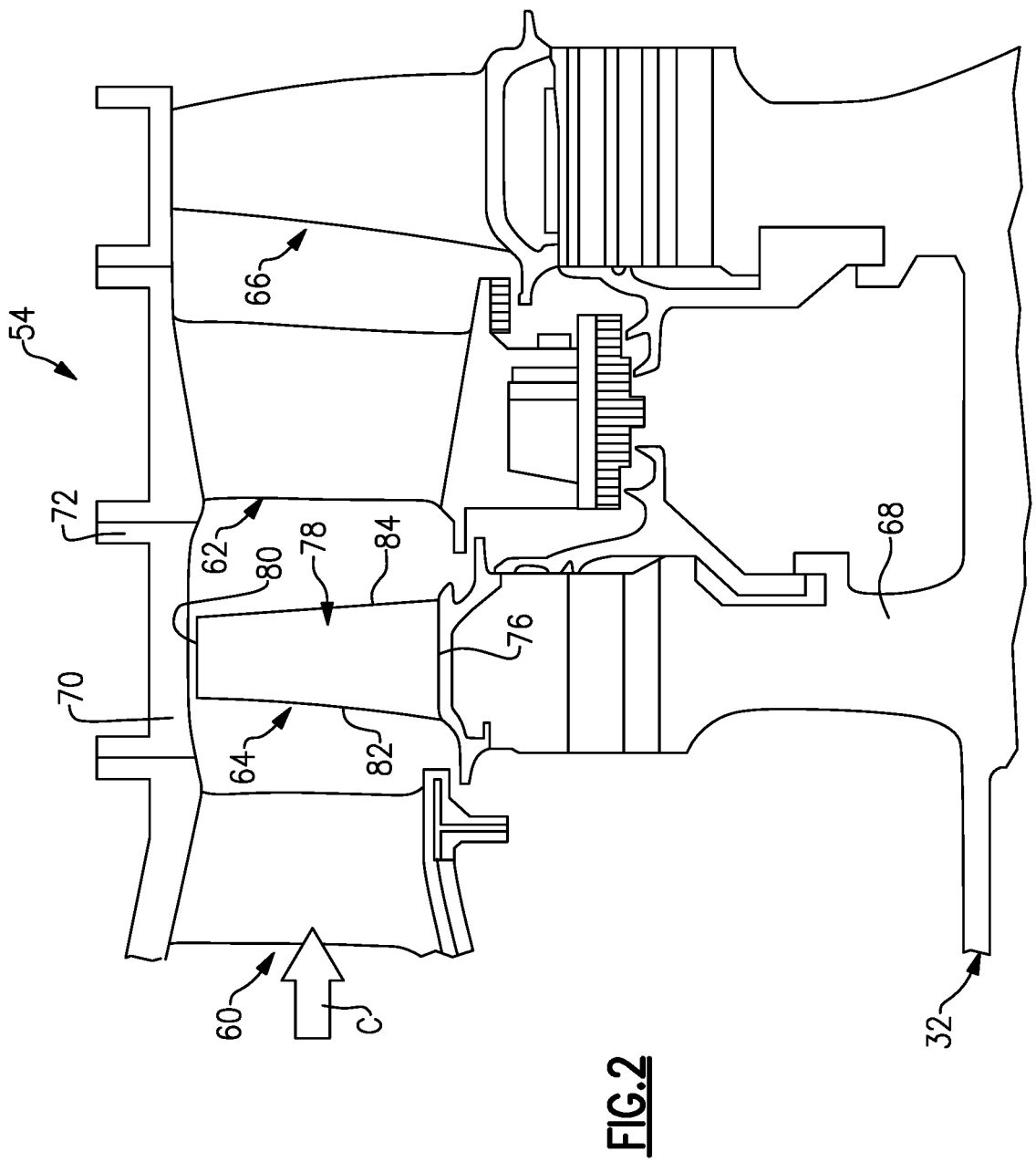
FIG. 2 is a schematic view of a section of the gas turbine engine of FIG. 1, such as a turbine section.

Referring to FIG. 2, a cross-sectional view through a high pressure turbine section 54 is illustrated. In the example high pressure turbine section 54, first and second arrays of circumferentially spaced fixed vanes 60, 62 are axially spaced apart from one another. A first stage array of circumferentially spaced turbine blades 64, mounted to a rotor disk 68, is arranged axially between the first and second fixed vane arrays. A second stage array of circumferentially spaced turbine blades 66 is arranged aft of the second array of fixed vanes 62. It should be understood that any number of stages may be used. Moreover, the disclosed airfoil may be used in a compressor section, turbine section and/or fixed or rotating stages.

The turbine blades each include a tip 80 adjacent to a blade outer air seal 70 of a case structure 72, which provides an outer flow path. In the illustrated example, the tip 80 is unshrouded. The first and second stage arrays of turbine vanes and first and second stage arrays of turbine blades are arranged within a core flow path C and are operatively connected to a spool 32, for example.

Figure 3:
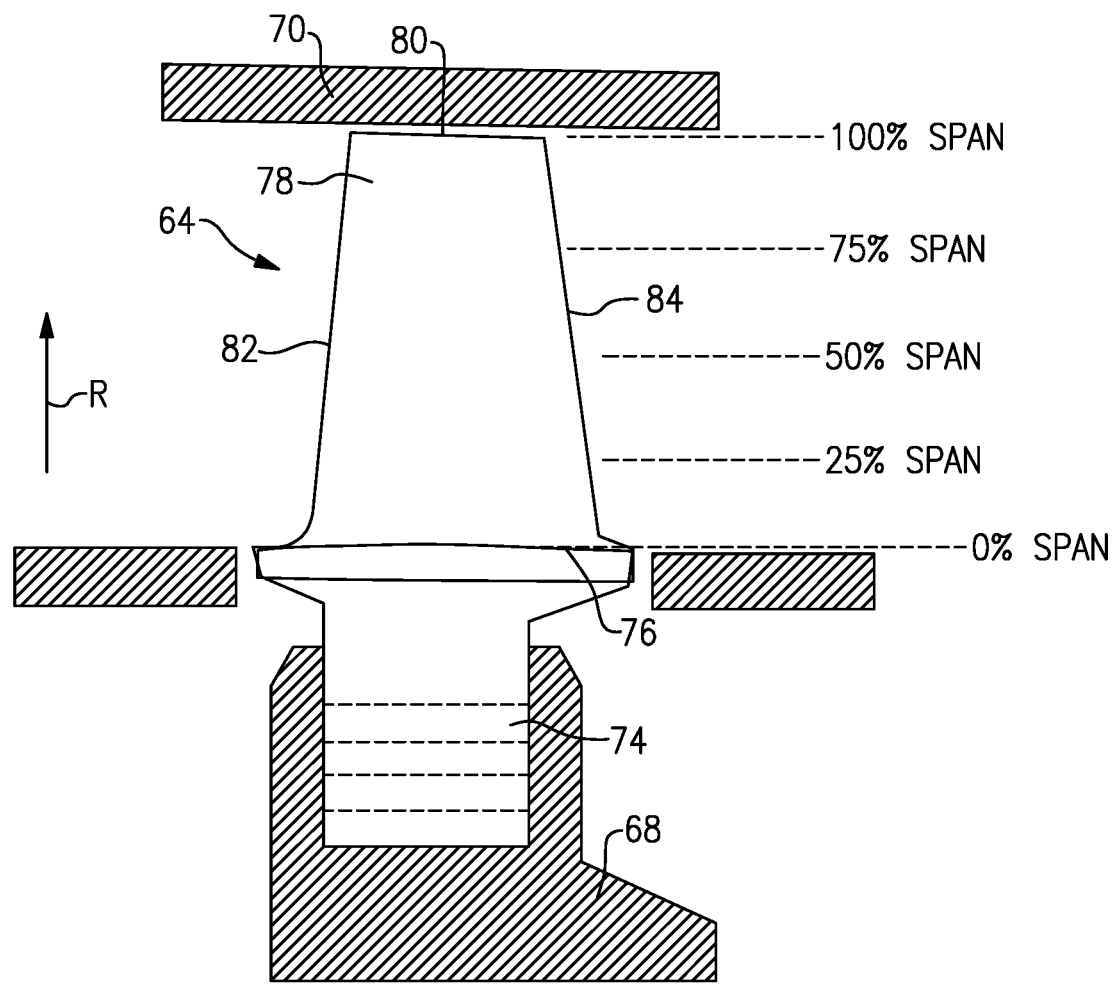
FIG. 3 is a schematic view of a turbine blade.

Each blade 64 includes an inner platform 76 respectively defining inner flow path. The platform inner platform 76 supports an airfoil 78 that extends in a radial direction R, as shown in FIG. 3. It should be understood that the turbine vanes 60, 62 may be discrete from one another or arranged in integrated clusters. The airfoil 78 includes a leading edge 82 and a trailing edge 84.

Figure 4:
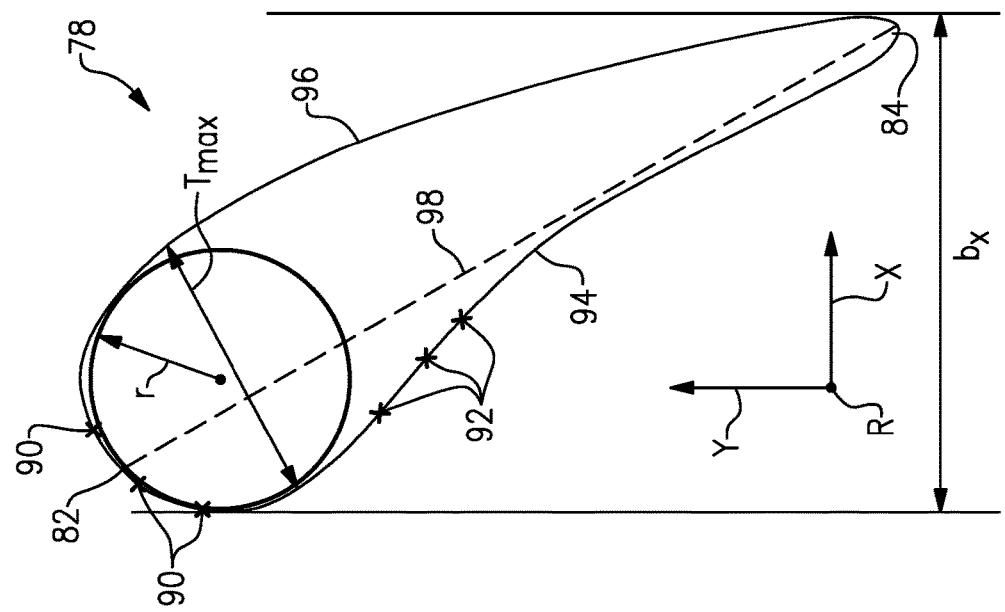
FIG. 4 is a cross-sectional view through an airfoil according to this disclosure.

The airfoil 78 is provided between pressure side 94 (predominantly concave) and suction side (predominantly convex) 96 in an airfoil thickness direction (FIG. 4), which is generally perpendicular to a chord-wise direction provided between the leading and trailing edges 82, 84. Multiple turbine blades 64 are arranged in a circumferentially spaced apart manner in a circumferential direction Y (FIG. 4). The airfoil 78 includes multiple film cooling holes 90, 92 respectively schematically illustrated on the leading edge 82 and the pressure side 94 (FIG. 4).

The turbine blades 64 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. Other cooling approaches may be used such as trip strips, pedestals or other convective cooling techniques. In addition, one or more thermal barrier coatings, abrasion-resistant coatings or other protective coatings may be applied to the turbine vanes 62.

FIGS. 3 and 4 schematically illustrate an airfoil including pressure and suction sides joined at leading and trailing edges 82, 84. A root 74 supports the platform 76. The root 74 may include a fir tree that is received in a correspondingly shaped slot in the rotor 68, as is known. The airfoil 78 extends a span from a support, such as an inner platform 76 to an end, such as a tip 80 in a radial direction R. The 0% span and the 100% span positions, respectively, correspond to the radial airfoil positions at the support and the end. The leading and trailing edges 82, 84 are spaced apart from one another and an axial chord $b_x$ length (FIG. 4) extends in the axial direction X.

A cross-section of the airfoil 78, as illustrated in FIG. 4, at a particular span location also has a maximum thickness $T_{max}$. The maximum thickness $T_{max}$ corresponds to the maximum thickness of the airfoil 78 perpendicular to a chord line 98. The chord line 98 is defined by a line extending between the leading edge 82 and the trailing edge 84. A leading edge radius corresponds to a radius of the largest circle that can fit adjacent the leading edge 82 of the airfoil and be within a perimeter of the airfoil 78.

Figure 5:
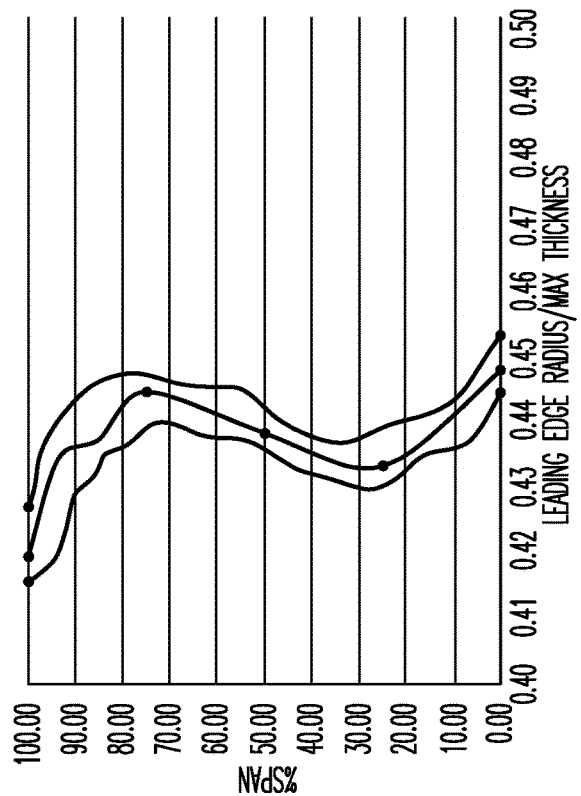
FIG. 5 is a graphical representation of a ratio of leading edge radius to maximum thickness for the airfoil according to this disclosure.

FIG. 5 illustrates a line graph representing a ratio of the leading edge radius r to maximum thickness $T_{max}$ being between 0.40 ($r/T_{max}$) and 0.45 ($r/T_{max}$) for three different non-limiting embodiments. In the illustrated non-limiting embodiment, the ratio of the leading edge radius r to the maximum thickness $T_{max}$ is 0.41 ($r/T_{max}$) at 100% span, 0.44 ($r/T_{max}$) at 75% span, 0.43 ($r/T_{max}$) at 50% span, 0.43 ($r/T_{max}$) at 25% span, and 0.45 ($r/T_{max}$) at 0% span. Moreover, in the illustrated non-limiting embodiment, the line illustrates an increasing ratio from 100% to approximately 75% span, a decreasing ratio from approximately 75% to approximately 25% span, and an increasing ratio from approximately 25% to 0% span such that there is an inflection point between 75% and 25% span.

In another embodiment, the ratio of the leading edge radius r to the maximum thickness $T_{max}$ is between 0.39-0.43 ($r/T_{max}$) at 100% span, 0.42-0.46 ($r/T_{max}$) at 75% span, 0.41-0.45 ($r/T_{max}$) at 50% span, 0.41-0.45 ($r/T_{max}$) at 25% span, and 0.43-0.47 ($r/T_{max}$) at 0% span.

Figure 6:
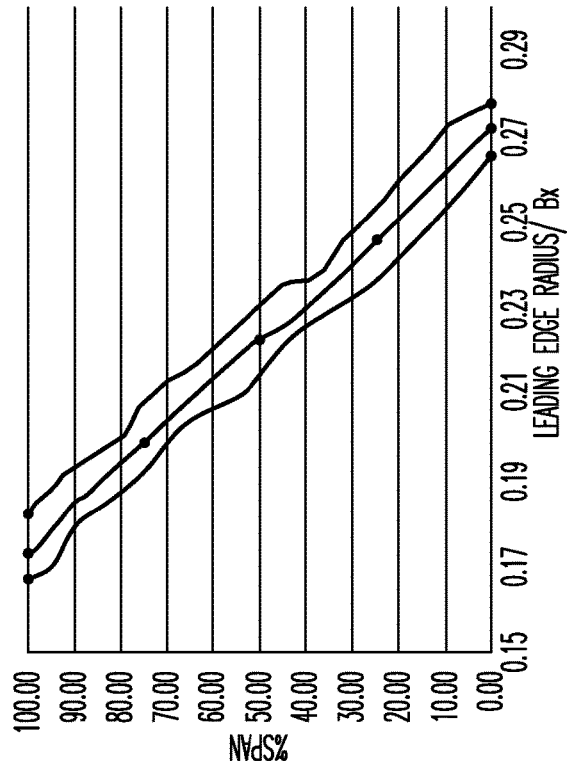
FIG. 6 is a graphical representation of a ratio of the leading edge radius to the axial chord length for the airfoil according to this disclosure.

FIG. 6 illustrates a line graph representing a ratio of the leading edge radius r to the axial chord $b_x$ being between 0.17 ($r/b_x$) and 0.27 ($r/b_x$) for three different non-limiting embodiments. In the illustrated non-limiting embodiment, the ratio of the leading edge radius R to the axial chord $b_x$ is 0.17 ($r/b_x$) at 100% span, 0.19 ($r/b_x$) at 75% span, 0.22 ($r/b_x$) at 50% span, 0.24 ($r/b_x$) at 25% span, 0.27 ($r/b_x$) at 0% span. Moreover, the ratio of the leading edge radius r to the axial chord $b_x$ is generally linear beginning at 100% span and increasing in a generally linear manner towards 0% span.

In another embodiment, the ratio of the leading edge radius R to the axial chord $b_x$ is between 0.15-0.19 ($r/b_x$) at 100% span, 0.17-0.21 ($r/b_x$) at 75% span, 0.20-0.24 ($r/b_x$) at 50% span, 0.22-0.26 ($r/b_x$) at 25% span, 0.25-0.29 ($r/b_x$) at 0% span.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A component for a gas turbine engine comprising:
   a platform having a radially inner side and a radially outer side;
   a root portion extending from the radially inner side of the platform; and
   an airfoil extending from the radially outer side of the platform, the airfoil including:
   a pressure side extending between a leading edge and a trailing edge;
   a suction side extending between the leading edge and the trailing edge; and
   a ratio of a leading edge radius to a maximum chord thickness of between 0.40 ($r/T_{max}$) and 0.47 ($r/T_{max}$) and a ratio of the leading edge radius to an axial chord length of between 0.15 ($r/b_x$) and 0.29 ($r/b_x$), wherein the maximum chord thickness of the airfoil is measured along a line perpendicular to a cord line and the leading edge radius is the radius of the largest circular that can fit within the perimeter of the airfoil adjacent the leading edge.

2. The component of claim 1, wherein the ratio of the leading edge radius to maximum chord thickness at 0% span is between approximately 0.43-0.47 ($r/T_{max}$).

3. The component of claim 2, wherein the ratio the leading edge radius to maximum chord thickness at 25% span is between approximately 0.41-0.45 ($r/T_{max}$).

4. The component of claim 3, wherein the ratio of the leading edge radius to maximum chord thickness at 50% span is between approximately 0.41-0.45 ($r/T_{max}$).

5. The component of claim 4, wherein the ratio of the leading edge radius to maximum chord thickness at 75% span is between approximately 0.42-0.47 ($r/T_{max}$).

6. The component of claim 5, wherein the ratio of the leading edge radius to maximum chord thickness at 100% span is between approximately 0.39-0.43 ($r/T_{max}$).

7. The component of claim 4, wherein the ratio of the leading edge radius to maximum chord thickness is increasing from 100% span to 75% span, decreasing from 75% span to 25% span, and increasing from 25% span to 0% span.

8. The component of claim 7, wherein the ratio of the leading edge radius to axial chord length at 100% span is between approximately 0.15-0.19 ($r/b_x$) and at 0% span is between approximately 0.25-0.29 ($r/b_x$).

9. The component of claim 8, wherein the airfoil is a blade and extends from the platform to an unshrouded end.

10. A gas turbine engine comprising:
a compressor section and a turbine section; and
a circumferential array of airfoils located in one of the compressor section and the turbine section, wherein the airfoil includes:
a pressure side extending between a leading edge and a trailing edge;
a suction side extending between the leading edge and the trailing edge; and
a ratio of a leading edge radius to maximum chord thickness of between 0.40 ($r/T_{max}$) and 0.47 ($r/T_{max}$) and a ratio of the leading edge radius to an axial chord length of between 0.15 ($r/b_x$) and 0.29 ($r/b_x$), wherein the maximum chord thickness of the airfoil is measured along a line perpendicular to a chord line and the leading edge radius is the radius of the largest circular than can fit within the perimeter of the airfoil adjacent the leading edge.

11. The gas turbine engine of claim 10, wherein the ratio of the leading edge radius to maximum chord thickness at 0% span is between approximately 0.43-0.47 ($r/T_{max}$).

12. The gas turbine engine of claim 11, wherein the ratio the leading edge radius to maximum chord thickness at 25% span is between approximately 0.41-0.45 ($r/T_{max}$).

13. The gas turbine engine of claim 12, wherein the ratio of the leading edge radius to maximum chord thickness at 50% span is between approximately 0.41-0.45 ($r/T_{max}$).

14. The gas turbine engine of claim 13, wherein the ratio of the leading edge radius to maximum chord thickness at 75% span is between approximately 0.42-0.46 ($r/T_{max}$).

15. The gas turbine engine of claim 14, wherein the ratio of the leading edge radius to maximum chord thickness at 100% span is between approximately 0.39-0.43 ($r/T_{max}$).

16. The gas turbine engine of claim 13, wherein the ratio of the leading edge radius to maximum chord thickness is increasing from 100% span to 75% span, decreasing from 75% span to 25% span, and increasing from 25% span to 0% span.

17. The gas turbine engine of claim 16, wherein the ratio of the leading edge radius to axial chord length follows a generally linear increasing pattern from 100% span to 0% span.

18. The gas turbine engine of claim 17, wherein the airfoil is a blade and extends from a platform to an unshrouded end.

* * * * *